United States Patent [19]
Huntt

[11] 3,950,845
[45] Apr. 20, 1976

[54] METHOD FOR MAKING RECORDING HEAD

[76] Inventor: Robert L. Huntt, 25007 Woodfield Road, Damascus, Md. 20750

[22] Filed: June 24, 1974

[21] Appl. No.: 482,604

[52] U.S. Cl. .................................. 29/603; 29/424; 360/127; 360/129
[51] Int. Cl.² ........................................ G11B 5/42
[58] Field of Search ............. 29/603, 424; 360/125, 360/127, 129

[56] References Cited
UNITED STATES PATENTS

| | | | |
|---|---|---|---|
| 3,064,333 | 11/1962 | Kristiansen et al. | 29/603 |
| 3,478,340 | 11/1969 | Schwartz et al. | 29/603 X |
| 3,543,396 | 12/1970 | Illg et al. | 29/603 |
| 3,668,775 | 6/1972 | Morita et al. | 29/603 |
| 3,789,505 | 2/1974 | Huntt | 29/603 |

Primary Examiner—Carl E. Hall
Attorney, Agent, or Firm—Cushman, Darby & Cushman

[57] ABSTRACT

A method of making a multi-core magnetic head in which two blocks of magnetic, ceramic material, configured to the desired pole piece shape, are joined with the two surfaces defining the gap being glass bonded, and the block cut to form individual pieces which are then glass bonded in grooves in the bottom of a U-shaped non-magnetic holder so that the pieces extend upward into the region bounded by the holder sides. The region is then potted and a carbon fixture placed over the ends of the upwardly extending pieces to provide additional mechanical strength. The potted assembly is then cut to leave upwardly extending pole legs.

7 Claims, 6 Drawing Figures

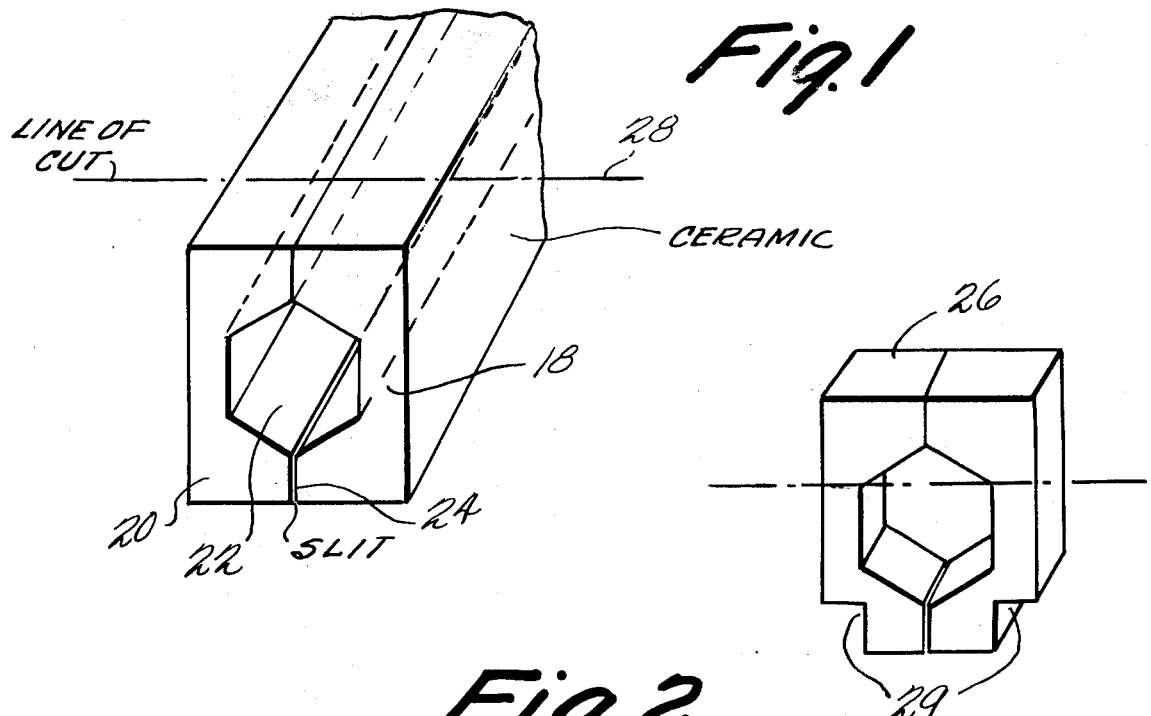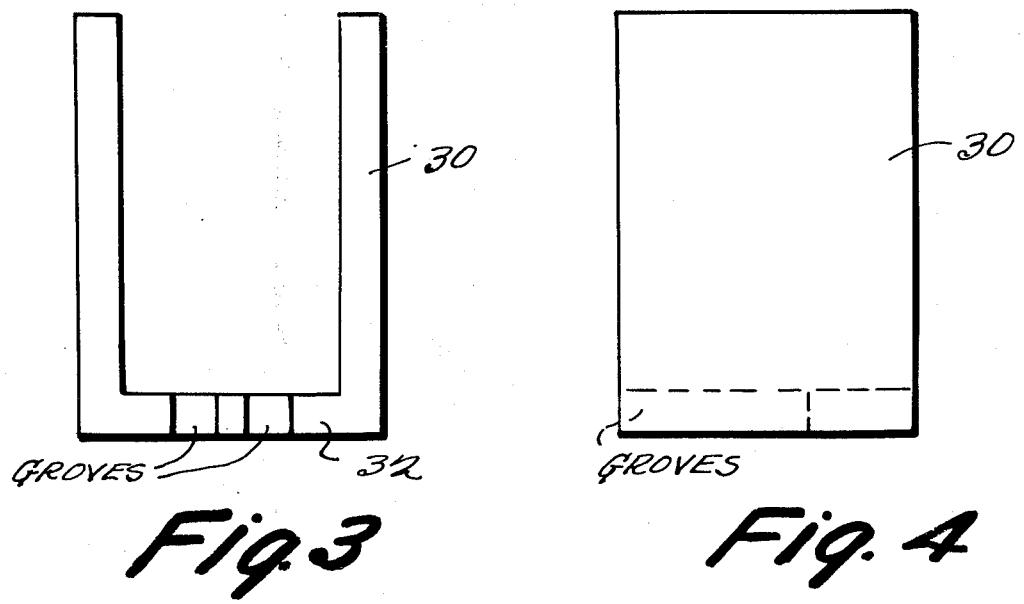

METHOD FOR MAKING RECORDING HEAD

BRIEF DESCRIPTION OF THE PRIOR ART AND SUMMARY OF THE INVENTION

The invention relates to a method of manufacturing a ceramic, multi-core magnetic transducer having a nonmagnetic holder.

A number of difficult problems have heretofore prevented manufacturers from making reproducible recording heads from ceramic and other similar magnetic materials, although these materials have large advantages for many applications. One of these problems is an inability to achieve uniformity from one pole piece to another within a given multicore head. A further problem is the inability to eliminate or even substantially reduce machining stresses. Most manufacturers consider, with this type of head, a 5 to 1 rejection rate as acceptable, i.e., five heads made for each one accepted.

Many attempts have been made in the past to reduce this expensive rejection rate. One technique which has been tried involves use of an epoxy potting material in which the individually cut magnetic heads are placed so that the epoxy provides mechanical strength during grinding, polishing and cutting. The patent to Hagadorn U.S. Pat. No. 3,466,637 describes one such method and the patent to Schwartz et al U.S. Pat. No. 3,478,340 shows another similar technique in which layers of non-magnetic material are disposed between layers of magnetic material to isolate adjacent heads.

A technique which has been found to be satisfactory is described in detail in application Ser. No. 225,571 filed Feb. 11, 1972, now U.S. Pat. No. 3,789,505 the disclosure of which is explicitly incorporated herein by reference. According to the technique described in that patent, a block of hot-pressed ferrite ceramic or other magnetic material is machined and cut to form a plurality of magnetic pieces of any suitable shape. A holder of non-magnetic material is machined to form a plurality of slots into which the individual magnetic pieces are bonded by any suitable method, such as glass bonding. Next the region into which the magnetic pieces extend from the slots in the magnetic holder is potted with a suitable epoxy or other material to provide mechanical strength during cutting and polishing. The non-magnetic holder and the magnetic pieces bonded to it are then cut into separate portions along a line passing through each of the pieces. The shape of the head is then ground out on each half to form the pole pieces and the potting material thereafter chemically or otherwise eliminated.

The present invention relates to a method similar to that described in the above-mentioned patent which is also satisfactory for producing a ceramic, multicore magnetic head with a lower reject rate than possible hitherto and resolving at least substantially the problems described above.

According to the technique of this invention, a pair of blocks of magnetic ceramic material are each first machined to provide the desired shape of the legs in the resulting head. The two blocks are then bonded together with a glass bonded slit forming the magnetic gap. The block is then cut to form a plurality of separate magnetic pieces, each of which is then inserted into matching grooves of two mating, U-shaped magnetic holders which can be then bonded together by any suitable technique.

A fixture of any suitable material, such as carbon, and having indentations for receiving the upwardly extended legs is placed over the legs to provide mechanical support. The magnetic pieces are glass bonded in the grooves of the nonmagnetic U-shaped matching holders and the space between the upwardly extending legs potted with epoxy resin or the like to provide, together with the carbon fixture, mechanical strength. The head is next cut or ground to complete the multicore head with the legs extending upward ready to receive windings or the like.

Many other objects and purposes of the invention will be clear from the following detailed description of the drawings.

BRIEF DESCRIPTION OF THE DRAWINGS

FIG. 1 shows a perspective view of the two blocks of ceramic material bonded together with a glass bonded magnetic gap;

FIG. 2 shows a perspective view of one of the magnetic pieces derived from the block of FIG. 1 and cut to provide steps adjacent the gap;

FIG. 3 shows an end view of one of the pair of U-shaped holders with a plurality of grooves for receiving magnetic ceramic pieces such as illustrated in FIG. 2;

FIG. 4 shows a side view of the U-shaped nonmagnetic holder of FIG. 3;

DETAILED DESCRIPTION OF THE DRAWINGS

Figure 5:
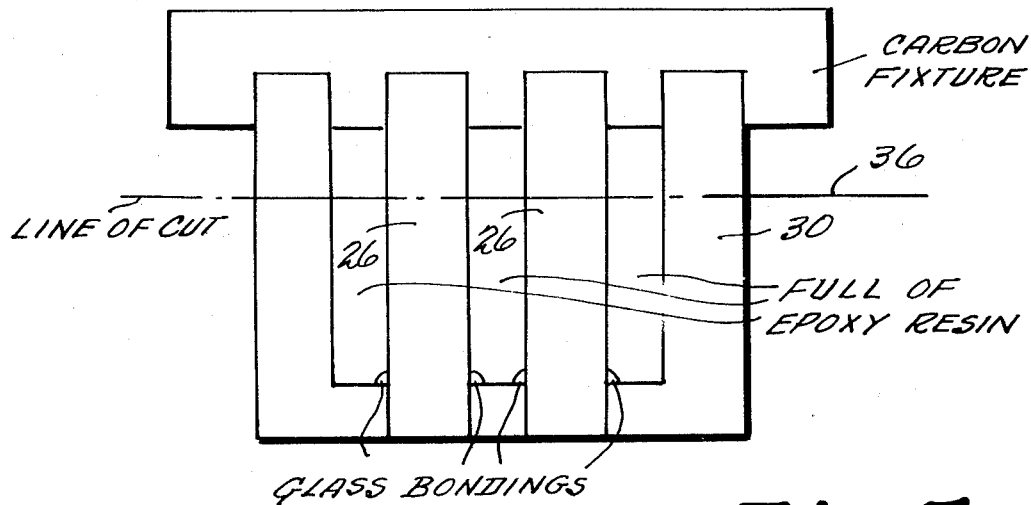
FIG. 5 shows a cut-away side of a plurality of magnetic pieces glass bonded in the grooves of the U-shaped holder with a carbon fixture providing mechanical support for the head during cutting or grinding.

Reference is now made to FIG. 1 which illustrates two blocks of magnetic ceramic material 18 and 20 which have been machined to the desired dimension for the magnetic pole pieces and fitted together as illustrated so that the resulting block has a bore 22 extending through its center. Any type of suitable magnetic ceramic material can be employed, but hot pressed types are preferred. Hot pressed nickel ferrite has been found to be quite satisfactory. The matching surfaces of blocks 18 and 20 which define the opposite side of slit 24 are also machined carefully so that slit 24 defines the magnetic gap for each piece when the head is completely assembled. The surfaces bounding slit 24 are glass bonded together to form the gap, for example as described in the patent to Case et al U.S. Pat. No. 3,687,650. The resulting joined block of material is then cut to form a plurality of separate magnetic pieces 26, such as illustrated in FIG. 2. One line of cut is shown along line 28 in FIG. 1. The individual pieces 26 are then further machined to provide steps as shown in FIG. 2. The geometry of the heads can be virtually any shape which is desired including triangular, square, pentagonal, circular, or virtually any other shape. However, the particular shape which is shown in FIG. 2 has been found to be effective. The step formed by surfaces 29 is useful in locating the head for machining. Other magnetic heads in the past have used surfaces forming steep angles, and the patent to Went et al, U.S. Pat. No. 2,854,524, shows one such head.

Reference is now made to FIGS. 3 and 4 which illustrate front and side views respectively of a U-shaped block of non-magnetic material 30 which has been machined to provide a plurality of grooves extending along the bottom 32 of each of the U-shaped holders 30 from one side thereof. The end of holder 30 onto which the grooves open out is then matched with a similar surface of an identical or similar U-shaped holder which also has grooves opening out onto it for providing a joined structure having a plurality of closed grooves, each receiving a magnetic pole piece 26.

The non-magnetic holder may be made of any suitable material. Particularly when the magnetic material is nickel ferrite, zinc ferrite has been found to be a very satisfactory non-magnetic holder material. However, it is believed that alumina and MgTi as well as many other materials may also be employed satisfactorily. Constructing both the non-magnetic holder and the magnetic pole pieces from ferrite material should considerably extend the wear characteristics of the completed transducer over that of the conventional metal head. Ferrites generally extend the life of the recording head at least five times compared to conventional magnetic heads. By constructing both the holder and the pole pieces of material having similar mechanical characteristics, the wear characteristics of the composite structure should be considerably enhanced.

FIG. 5 shows a cut-away view of a composite structure with a number of pieces 26 disposed in a plurality of grooves of a pair of U-shaped holders, which have been mated and held together by any suitable means. For purposes of illustration, one of the U-shaped holders has been removed. As shown in FIG. 5, the magnetic pole pieces are then glass bonded, for example as described in the above-mentioned Case et al patent, to the non-magnetic holder preferably at the locations indicated in FIG. 5.

Glass bonding is expected to be especially satisfactory but other bonding techniques including the use of enamel, epoxies, glue, etc. can be employed. If glass bonding is used, it is desirable that the pole pieces, non-magnetic material and glass or glasses have, within 5%, the same thermal expansion coefficients, the glasses available for bonding having a wide range of thermal expansion coefficients. Such bonding techniques are well known in the art.

Figure 6:
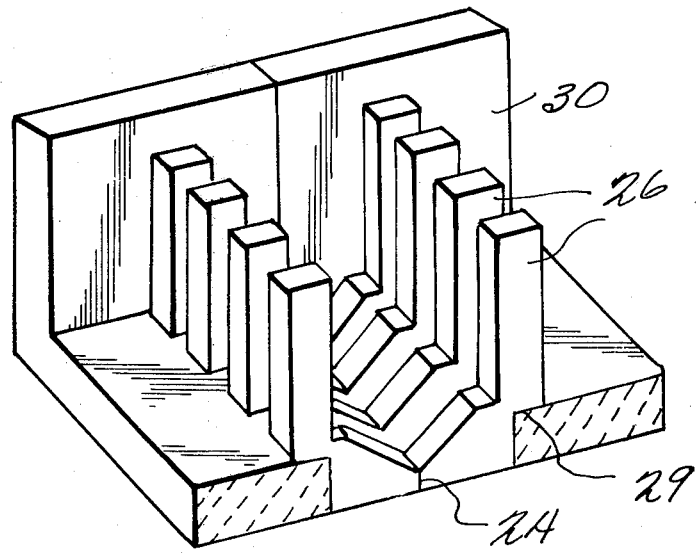
FIG. 6 shows a cut-away perspective view of the complete multicore magnetic head.

Next the spaces between U-shaped holder 30 and the magnetic pieces 26 are filled with a conventional epoxy resin which provides mechanical strength. For providing an even greater mechanical strength, a carbon or other fixture, having a plurality of indentations for receiving the upwardly extending ends of the pieces 26, is placed as illustrated. Next, the combination can be cut or ground along line 36 to remove the upper portions of pieces 26 and leave upwardly extending pole legs. After depotting, a multicore head as illustrated in FIG. 6 results. With this technique, it has been found that not only is the rate of rejection markedly reduced, but the resulting characteristics of the head are superior.

Next, wire coils can be dropped onto the upwardly extending pole legs and suitable back bars bonded between each set of upwardly extending pole pieces as desired. Conventionally, the composite structure, either with or without shields, is then potted in a suitable material and the front section of the head ground, lapped and polished exposing pole pieces and shields or simply pole pieces, if shields are not employed. The shield material can be either a ceramic material having a high permeability or a metal having a high permeability. Many shields are conventionally known and available.

Many changes and modifications in the above-described embodiment of the invention can, of course, be carried out without departing from the scope thereof. Accordingly, that scope is intended to be limited only by the scope of the appended claims.

What is claimed is:

1. A method of making a multi-core magnetic head comprising the steps of:

joining two blocks of magnetic, ceramic material together including bonding together two opposing block surfaces defining a magnetic gap, said joined blocks having a central aperture extending therethrough, cutting said joined blocks along lines extending roughly transverse to said aperture axis to form a plurality of magnetic pieces each having a central aperture, placing a number of said pieces in grooves cut in the bottom of a U-shaped non-magnetic holder having sides extending upward from said holder so that said pieces extend into the region bounded by said sides, bonding said pieces placed in said grooves to said holder, potting the region between said sides of said holder into which said pieces extend with potting material, cutting along a line passing through the central aperture to leave upwardly extending pole legs and removing said potting material.

2. A method as in claim 1 wherein said steps of bonding each include glass bonding.

3. A method as in claim 1 further including the step of mating two U-shaped holder portions to form said U-shaped holder.

4. A method as in claim 3 further including the steps of forming a plurality of grooves in the bottoms of each of said holder portions.

5. A method as in claim 1 including the step of placing a fixture having indentations for receiving the upwardly extending ends of said pieces after said pieces have been placed in said groove and before cutting to leave upwardly extending pole legs, so as to provide mechanical support during cutting.

6. A method as in claim 1 wherein said step of potting includes the step of potting with an epoxy resin.

7. A method as in claim 1 including the further step of cutting to form steps adjacent said magnetic gap before placing said pieces in said groove.

* * * * *